(12) United States Patent
Park et al.

(10) Patent No.: US 12,424,428 B2
(45) Date of Patent: Sep. 23, 2025

(54) APPARATUS FOR ANALYZING MASS SPECTRAL DATA

(71) Applicant: Bruker Daltonics GmbH & Co. KG, Bremen (DE)

(72) Inventors: Robin Park, San Diego, CA (US); Sven Brehmer, Lilienthal (DE)

(*) Notice: Subject to any disclaimer, the term of this patent is extended or adjusted under 35 U.S.C. 154(b) by 579 days.

(21) Appl. No.: 17/735,309

(22) Filed: May 3, 2022

(65) Prior Publication Data

US 2022/0351955 A1    Nov. 3, 2022

Related U.S. Application Data

(60) Provisional application No. 63/183,333, filed on May 3, 2021.

(51) Int. Cl.
*H01J 49/00* (2006.01)
*G01N 27/623* (2021.01)
(Continued)

(52) U.S. Cl.
CPC ........ *H01J 49/0036* (2013.01); *G01N 27/623* (2021.01); *H01J 49/06* (2013.01);
(Continued)

(58) Field of Classification Search
CPC .................................................. H01J 49/0036
See application file for complete search history.

(56) References Cited

U.S. PATENT DOCUMENTS 6,229,808 B1 * 5/2001 Teich ................. H04Q 11/0478
370/398
9,311,721 B1 * 4/2016 Loughry ................. G06T 1/20
(Continued)

FOREIGN PATENT DOCUMENTS

WO    2019028004 A1    2/2019
WO    2019243836 A1    12/2019

OTHER PUBLICATIONS

Meier et al., "Online Parallel Accumulation-Serial Fragmentation (PASEF) with a Novel Trapped Ion Mobility Mass Spectrometer", Mol Cell Proteomics; 2018; 17(12): 2534-2254.
(Continued)

*Primary Examiner* — Hyun D Park
(74) *Attorney, Agent, or Firm* — Benoît & Côté Inc.

(57) ABSTRACT

An apparatus for analyzing peak data generated from mass signals acquired by a mass spectrometric system comprises: a streaming device that comprises a first network interface and is configured to generate peak data from the mass signals or receive peak data generated externally from the mass signals, group the peak data into independently-processable data packets related to a processing task, and distribute the data packets in a task-specific stream via the first network interface onto a network; and at least one analyzing device that comprises a second network interface and is configured to retrieve a data packet of the task-specific stream via the second network interface from the network, perform the processing task on the retrieved data packet to produce result data, package the result data in a result data packet, and distribute the result data packet via the first network interface onto the network.

27 Claims, 4 Drawing Sheets

(51) Int. Cl.
*H01J 49/06* (2006.01)
*H01J 49/10* (2006.01)
*H01J 49/40* (2006.01)
*H01J 49/42* (2006.01)

(52) U.S. Cl.
CPC .............. *H01J 49/10* (2013.01); *H01J 49/40* (2013.01); *H01J 49/4215* (2013.01)

(56) References Cited

U.S. PATENT DOCUMENTS

| | | | | |
|---|---|---|---|---|
| 2003/0213900 A1* | 11/2003 | Hoyes | ..................... | H01J 49/42 250/282 |
| 2013/0341191 A1* | 12/2013 | Smith | ..................... | B01L 3/502 204/601 |
| 2014/0160930 A1* | 6/2014 | Kwon | ..................... | H04L 1/188 370/235 |
| 2015/0102227 A1* | 4/2015 | Nyg | ........................ | H04N 25/77 250/370.09 |
| 2016/0003842 A1* | 1/2016 | Lee | ........................ | G01N 33/50 702/19 |
| 2020/0303034 A1 | 9/2020 | Park et al. | | |
| 2020/0378983 A1* | 12/2020 | Bailey | ................ | G01N 33/6848 |
| 2021/0335588 A1* | 10/2021 | Boskamp | ............ | H01J 49/0004 |
| 2022/0351955 A1* | 11/2022 | Park | ........................ | H01J 49/10 |

OTHER PUBLICATIONS

Meier et al. "diaPASEF: parallel accumulation-serial fragmentation combined with data-independent acquisition", Nat Methods; 2020; 17(12): 1229-1236.

* cited by examiner

APPARATUS FOR ANALYZING MASS SPECTRAL DATA

FIELD OF THE INVENTION

The invention relates to apparatus for analyzing mass spectral data acquired by a mass spectrometric system, in particular a mass spectrometric system comprising a mobility separator and a mass analyzer, and methods for analyzing mass spectral data using the apparatus.

BACKGROUND OF THE INVENTION

Proteomics is currently a core technology in life sciences and an approach to understanding molecular mechanisms underlying normal and disease phenotypes and identifying critical diagnostic and prognostic biomarkers. Proteomics seeks to identify proteins potentially present in a sample and to assess protein abundance, localization, posttranslational modifications, isoforms, and molecular interactions. As a discipline, proteomics has grown at the interface of instrumental engineering, biochemistry and bioinformatics, with an emphasis on high throughput and reduced user bias. Accordingly, technologies used are varied, but almost always utilize coupled techniques, like liquid chromatography/mass spectrometry.

Furthermore, metabolomics has increasingly become an important research approach in the life sciences in recent years. The term "metabolomics" describes the analytical detection of low molecular weight metabolic compounds in a biological system, e.g. in a cell, in a tissue, or in body fluids such as urine or blood plasma. The totality of these compounds, the metabolome, consists of the primary and secondary metabolites of endogenous metabolism, such as amino acids, sugars, lipids, nucleosides, steroids, alcohols, etc., as well as exogenous substances, such as drugs. Metabolomics as well as proteomics are directed to complex mixtures of analytes with a high dynamic range of abundances.

Mass spectrometric systems have been developed which couple a liquid chromatography (LC) device, an ion mobility separator, and a time-of-flight mass analyzer. Systems coupling different separation device are often called hybrid systems. FIG. 1 shows a schematic of an exemplary mass spectrometric system 100 and an apparatus 10 for acquiring and analyzing mass spectral data according to the prior art.

The mass spectrometric system 100 comprises a LC device 110, an ion source 121, an ion mobility separator 144, a quadrupole mass filter 150, a fragmentation cell 160, and a time-of-flight (TOF) mass analyzer 170.

The ion mobility separator 144 can for example be a trapped ion mobility separator (TIMS) which can be operated in a parallel accumulation mode. In this mode, ions are accumulated in an upstream part of the ion mobility separator or an upstream ion trap (not shown) while pre-accumulated ions are analyzed in a downstream part of the ion mobility separator parallel in time. The TOF mass analyzer 170 is typically a time-of-flight analyzer with orthogonal ion injection (OTOF).

The LC device 110 is coupled to the ion source 121 which is typically an electrospray (ESI) ion source operated at atmospheric pressure. Other types of ion sources are possible. Ions generated in chamber 120 are introduced via a transfer capillary 141 into a first vacuum chamber 140 and then deflected into a RF-funnel 143 by a repelling electric DC potential applied to a deflector electrode 142. The RF-funnel 143 collects ions transmitted through the transfer capillary 141 or generated by an additional MALDI source in the chamber 140 (not shown) and guides them to the ion mobility separator 144. Ions released from the ion mobility separator 144 according to mobility are guided to the quadrupole mass filter 150 which either transmits ions or selects ions according to mass. The ions that are transmitted by the quadrupole mass filter 150 are directed to a fragmentation cell 160 for generating fragment ions. Fragmentation can be achieved by collision induced dissociation (CID) or any other known type. The fragmentation can be switched on and off, controlled by instrumental parameters. Precursor ions can be trapped in the fragmentation cell 160 without being fragmented, as well as fragment ions when fragmentation is enabled.

The mass spectrometric system is controlled by the apparatus 10 via control line 12. The apparatus 10 comprises a central processing unit 11 (CPU), an acquisition unit 13, a memory 14 and a graphics processing unit 15 (GPU). The components of the apparatus 10 are connected by a local bus 16, e.g. by a Peripheral Component Interconnect Express (PCI express) bus. The acquisition unit 13 is connected to an ion detector 171 which is located at the end of the flight path and configured to generate a pulsed electron current for ions impinging on the ion detector 171. Typically, the ion detector comprises a secondary electron multiplier like a micro-channel plate detector. The acquisition unit comprises an analog-to-digital converter for digitizing the pulsed electron current and a processing unit to generate peak data from the digitized current, e.g. by using a real-time peak finding algorithm applied to the digitized current.

The TOF mass analyzer 170 has such a large acquisition rate for mass spectra that multiple mass spectra are acquired during a mobility separation. The peak data is a list of ordered pairs wherein each pair represents a mass signal of an acquired mass spectrum and comprises a mass related value (e.g. time-of-flight) and one intensity related value. The peak data for all mass spectra acquired during a single mobility separation are stored in a file-based representation in the memory 14, and the data structure is determined by the temporal sequence of data acquisition. U.S. application Ser. No. 16/367,296 (published as US 2020/0303034 A1) discloses that the cores of a GPU can be used for processing the peak data in parallel.

Mass spectrometric systems comprising a mobility separator enable the acquisition of fragment mass spectra in data-dependent mode at highest rates as shown in the paper by Meier et al. (Mol Cell Proteomics; 2018 December; 17(12):2534-2254: "Online Parallel Accumulation—Serial Fragmentation (PASEF) with a Novel Trapped Ion Mobility Mass Spectrometer"). Furthermore, they are highly suitable for acquiring mixed fragment mass spectra in data-independent mode which can be processed (deconvolved) based on the mobility information, as shown in the paper by Meier et al. (Nat Methods; 2020 December; 17(12): 1229-1236: "diaPASEF: parallel accumulation-serial fragmentation combined with data-independent acquisition").

All mass spectrometric systems with high spectra acquisition rates are suitable for in-depth analysis of complex samples in proteomics and metabolomics. Increased acquisition rates of mass spectra (MS) and fragment mass spectra (MS2) have made it possible to identify and quantify more and more compounds in a single analysis, but have also significantly increased the amount of mass spectral data which needs to be analyzed. The amount of mass spectral data is equally increased by mass spectrometric imaging where an ion source is configured to generate ions from multiple positions of a two-dimensional sample, e.g. a tissue section, such that the number of samples and thus acquired mass spectra and fragment mass spectra corresponds to the number of pixels of the mass spectrometric image.

The advances on the instrumental side of mass spectrometric systems create a need for advanced apparatus for analyzing mass spectral data that keep up with the high acquisition rates of the instruments. These apparatuses might be an important step to use mass spectrometric systems not only in research, but also for clinical routine applications.

SUMMARY OF THE INVENTION

The invention provides an apparatus for analyzing peak data generated from mass signals acquired by a mass spectrometric system. The apparatus comprises a streaming device and at least one analyzing device. The streaming device comprises a first network interface and is configured to (a) generate peak data from the acquired mass signals or to receive peak data generated externally from the acquired mass signals, (b) group the peak data into independently processable data packets which relate to a processing task, and (c) distribute the data packets in a task-specific stream via the first network interface onto a network. The at least one analyzing device comprises a second network interface and is configured to (a) retrieve a data packet of the task-specific stream via the second network interface from the network, (b) perform the processing task on the retrieved data packet to produce result data, (c) package the result data in a result data packet, and (d) distribute the result data packet via the first network interface onto the network.

The peak data is a series of tuples, each tuple representing a single mass signal of an acquired mass spectrum wherein a tuple is defined as a finite ordered list of values. Each data packet is a subset of the peak data and independently processable means that the analyzing device can perform the processing task on a single data packet without additional peak data. The network is not a local computer bus implemented in the streaming device. The intersection set between a first data packet and a second data packet of the task-specific stream must not be empty, i.e., that a single tuple of the peak data can be present in different data packets of the task-specific stream.

The at least one analyzing device can comprise multiple processing units each of which is configured to perform the processing task on different data packets simultaneously. The at least one analyzing device preferably comprises more than 10, 100, 500 or 1000 processing units. Preferably, the at least one analyzing device comprises a central processing unit (CPU), a global memory, and a graphics processing unit (GPU). The CPU is configured to store retrieved data packets of the task-specific stream in the global memory, to transform the data packets into a GPU compatible format, to transfer the transformed data packets to the GPU cores which perform the processing task on the transformed data packets simultaneously. The CPU, GPU and the global memory are connected by a local computer bus, e.g. by a Peripheral Component Interconnect Express (PCI express) bus.

The apparatus can comprise a plurality of analyzing devices which are configured to perform the processing task on different data packets simultaneously. Preferably, the apparatus comprises more than 2, 5, 10 or 20 analyzing devices. Each data packet is preferably distributed with a header that comprises an identification key and/or information regarding the analyzing device which is intended to retrieve and process the data packet. The analyzing devices can be further configured to retrieve result data packets of the other analyzing devices wherein the result data of an analyzing device comprises information that a specific data packet is processed by the analyzing device. Such a feedback stream may help to organize the distribution of data packets to multiple analyzing devices.

The streaming device can be configured to group the peak data into independently processable data packets which relate to different processing tasks and to distribute the data packets in different task-specific streams onto the network. Each data packet can be distributed with a header that comprises information regarding the processing task whose execution is intended for the data packet. The intersection set between a first data packet of a first task-specific stream and a second data packet of a different task-specific stream must not be empty, i.e., that a single tuple of the peak data can be present in different task-specific streams.

Each data packet can be distributed with a header that comprises operation parameters of the mass spectrometric system and/or acquisition times of the mass signals represented in the data packet which relate to retention times of corresponding analytes eluting from a separation device coupled to the mass spectrometric system.

The streaming device can be configured to generate each data packet of a task-specific stream immediately after the peak data needed for the data packet is available such that the data packets of the task-specific stream are distributed in real-time onto the network.

In one embodiment, the streaming device comprises an acquisition unit which is connected to a local computer bus of the streaming device and to an ion detector of the mass spectrometric system and is configured to generate the peak data from mass signals detected by the ion detector. Preferably, the ion detector generates a pulsed electron current and the acquisition unit comprises an analog-to-digital converter for digitizing the pulsed electron current and a processing unit to generate the peak data from the digitized signal, e.g. by using a real-time peak finding algorithm. The ion detector can comprise a secondary electron multiplier, e.g. a multi-channel plate. The acquisition unit can transfer single tuples or groups of tuples to a memory of the streaming device wherein the each group may for example comprise the tuples of a single acquired mass spectrum or the tuples of a plurality of acquired mass spectra.

In another embodiment, the streaming device is connected to an acquisition unit of the mass spectrometric system via the network or an additional data link. The acquisition unit is connected to an ion detector of the mass spectrometric system and configured to (a) generate the peak data from mass signals detected by the ion detector and (b) transmit the peak data to the streaming device via the network interface or the additional data link, respectively. The peak data are transmitted as packets wherein a packet can for example comprise a single tuple, all tuples of a single acquired mass spectrum or all tuples of a plurality of acquired mass spectra.

The streaming device can further be configured to retrieve the result data packet from the network and organize them according to a predetermined result data protocol. Preferably, the streaming device is connected to the mass spectrometric system and configured to modify its operation depending on the result data of the retrieved result data packets. The streaming device can further be configured to combine the peak data and the retrieved result data into independently processable data packets which relate to an additional processing task and to distribute the data packets in an additional task-specific stream via the first network interface onto a network.

The apparatus can further comprise an additional device that is configured to retrieve the result data packet from the network and organize them according to a predetermined result data protocol. The additional device can be connected to the mass spectrometric system and configured to modify its operation depending on the result data of the retrieved result data packets. The additional device or the streaming device can also be used as an output device for a user.

The network can be a part of the apparatus. Preferably, the network is a local area network and uses an ethernet protocol. The network can also use an internet protocol (IP) wherein the first network interface is preferably assigned to a fixed network IP-address to enable a direct network connection. The analyzing devices can further be configured to communicate with other sources (e.g., databases or cloud services) via the network for requesting additional data which are not peak data and are needed to perform processing tasks.

The invention provides methods for analyzing peak data using an apparatus according to the invention and in particular methods for generating the task-specific streams.

The task-specific streams can for example relate to (a) precursor search in mass spectra, (b) identification of analytes, like peptides, proteins or metabolites, from fragment mass spectra, (c) assigning fragment mass signals of mixed fragment mass spectra, which comprise fragment mass signals from different precursor ion species, to one of the precursor ion species, or (d) detection of post-translational modified peptides from fragment mass spectra.

The apparatus according to the invention can analyze peak data generated from mass signals which are acquired by different kinds of mass spectrometric systems. These mass spectrometric systems comprise an ion source and a mass analyzer, e.g., a time-of-flight analyzer, an electrostatic ion trap, an RF ion trap, or an ion cyclotron frequency ion trap. Preferably, the mass spectrometric system further comprises an ion mobility separator (IMS) and a fragmentation cell wherein the peak data is a series of ordered triples (3-tuples). Each ordered triple represents a single mass signal of an acquired mass spectrum and comprises one mobility related value (e.g. IMS scan time or number of spectrum in the IMS scan, or calibrated mobility), one mass related value (e.g. time-of-flight or calibrated mass) and one intensity related value (e.g. maximum value of the mass signal). The ion mobility separator is preferably located between the ion source and the fragmentation cell. Optionally, the preferred mass spectrometric system can comprise a mass filter which is preferably located between the ion mobility separator and the fragmentation cell. The fragmentation cell is preferably located between the ion mobility separator and the mass analyzer or between the mass filter and the mass analyzer. Furthermore, a separation device, like a gas or liquid chromatography device or an electrophoretic device, can be part of or coupled to the mass spectrometric system.

The ion source generates ions, for example by using spray ionization (e.g., electrospray (ESI) or thermal spray), desorption ionization (e.g., matrix-assisted laser/desorption ionization (MALDI) or secondary ionization), chemical ionization (CI), photo-ionization (PI), electron impact ionization (EI), or gas-discharge ionization. The ion mobility separator can for example be a drift-type IMS (DTIMS), travelling wave IMS (TWIMS) or trapped ion mobility separator (TIMS). The ions can for example be fragmented in the fragmentation cell by collision induced dissociation (CID), surface induced dissociation (SID), photo-dissociation (PD), electron capture dissociation (ECD), electron transfer dissociation (ETD), collisional activation after electron transfer dissociation (ETcD), activation concurrent with electron transfer dissociation (AI-ETD) or fragmentation by reactions with highly excited or radical neutral particles.

The ion source can be configured to generate ions from different positions of a two-dimensional sample, e.g., a tissue section. Therefore, the peak data can be a series of ordered quintuples (5-tuples) wherein each quintuple represents a single mass signal in an acquired mass spectrum and comprises two coordinates values of the ionization position on the sample, one mobility related value, one mass related value and one intensity related value. Without mobility separation, the peak data can be a series of ordered quadruples (4-tuples) wherein each quadruple represents a single mass signal in an acquired mass spectrum and comprises two coordinates values of the ionization position on the sample, one mass related value and one intensity related value.

The apparatus according to the present invention is preferably connected to a mass spectrometric system that comprises an IMS separator, a mass filter, a fragmentation cell and a time-of-flight mass analyzer (TOF) with orthogonal ion injection. The spectra acquisition rate of the TOF mass analyzer is so large that multiple mass spectra can be acquired during a single IMS separation (cycle). The peak data span a mass-mobility map for which one axis indicates a mobility related value and a perpendicular axis indicates the mass related value. In a MS1 cycle, the fragmentation of ions separated in the IMS separator is switched off. In a MS2 cycle, the fragmentation of ions separated in the IMS separator is switched off. During a MS2 cycle, the mass filter can be operated such that only ions inside a mass window are transmitted from the ion mobility separator to the fragmentation cell. The position of the mass window can be varied step-wisely (with or without overlap between consecutive mass windows) or continuously (with overlap between consecutive mass windows) during the MS2 cycle. The width of the mass window can be adjusted to transmit a single ion species or a limited mass range of ion species.

A first task-specific stream relates to finding appropriate precursor ion species in a mass-mobility map of a MS1 cycle. These identified precursor ion species can be used in a subsequent MS2 cycle of a data-dependent analysis (DDA) or a targeted analysis of predetermined ion species, e.g. in parallel reaction monitoring (PRM).

The data packets are generated from peak data of a mass-mobility map of the MS1 cycle. The mass-mobility map is divided into regions wherein each region has a limited mobility and mass range. For a DDA, the regions can cover the mass-mobility map where any ion species are expected to be present. The different regions may or may not overlap along the mobility and/or mass direction. For a targeted analysis, the regions cover the mass-mobility map only where the predetermined ion species may be present. Each data packet comprises a subset of the peak data wherein each subset comprises those ordered triples of the peak data whose mobility related values and mass related values fall in one of the regions. The streaming device generates the different data packets and transmits them to the analyzing devices which perform the processing task on the data packets and distribute the result data comprising mobility and mass of appropriate precursor ion species onto the network. The streaming device retrieves the result data packet from the network and controls the mass filter in a subsequent IMS separation such that the selected precursor ion species or a subset thereof is isolated in the mass filter and fragmented. Typically, multiple MS2 cycles follow one MS1 cycle for analyzing all appropriate precursor ion species found as result from the first task-stream.

A second task-specific stream relates to identification of an ion species using the mass signals of fragment mass spectra acquired during the subsequent IMS separation(s) of the MS2 cycle(s) mentioned above.

As explained above, the streaming device can control the mass filter during a MS2 cycle such that single precursor ion species are successively isolated in the mass filter and fragmented, i.e., that the position of the mass window of the mass filter is adjusted to different precursor ion species during an IMS separation. Typically, the mass filter is set to the mass of a precursor ion species for a duration in which multiple fragment mass spectra can be acquired for the precursor ion species. Each data packet comprises the peak data of the multiple fragment mass spectra of a single isolated precursor ion species. If the same precursor ion species is isolated in two or more MS2 cycles, the corresponding data packet can comprise the peak data of the multiple fragment mass spectra of the precursor ion species acquired in the two or more MS2 cycles.

The identification is performed by an analyzing device and can comprise comparing the measured fragment mass signals (represented by the triples of the data packet) with reference fragment mass spectra or in-silico generated fragment spectra of known substances. The reference fragment mass spectra and in-silico generated fragment spectra are additional data needed for the identification can be stored locally in the analyzing devices or requested from external sources via the network.

Preferably, the data packet is distributed with a header comprising the mass position of the mass filter during the acquisition of the fragment mass spectra (i.e. the mass of the precursor ion). Each data packet comprises a series of triples wherein each triple represents a fragment mass signal of the precursor ion species and comprises a mobility related value of the fragment mass signal as well as a mass related value and an intensity related value. Since the mobility related value of fragments coincides with the mobility related value of the corresponding precursor ion species, the analyzing device intended to process the data packet has the information about the mass and mobility of the precursor ions species. The information about the mass and, optionally, about the mobility of the precursor ion species can be used to reduce the search space of the comparison during the identification process. For example, the data packets can be processed by a plurality of processing units of an analyzing device and each one of these processing units can for example be assigned to a limited search space with respect to the mass and, optionally, mobility of the precursor ion species. Each of the processing units stores only the additional data of a limited subset of precursor ions.

The data packets can be processed by a plurality of analyzing devices and each one of these analyzing devices can for example be assigned to a limited search space with respect to the mass and, optionally, mobility of the precursor ion species. The streaming device can transmit the data packets to the analyzing devices depending on the mass and mobility of the precursor ion species.

The result stream of the identifications can be transmitted from the analyzing devices to the streaming device. For example, if a result for one of the data packets did not lead to an sufficient identification, the streaming device can reschedule the associated precursor ion species with adjusted parameters (e.g., higher collision energy in CID dissociation) or accumulate fragment mass spectra of the precursor ion species in more MS2 cycles. In bottom-up proteomics, a precursor ion species relates to a digest peptide of a protein and the stream-specific task can also include the identification of the protein. A result stream from the analyzing devices can for example comprise in-silico generated digest peptides of all identified proteins wherein a single result data packet includes all in-silico generated digest peptides of a single identified protein. This result stream can be used by the streaming device to update a list of precursor ion species for which fragment mass spectra should be acquired wherein the in-silico generated digest peptides of identified proteins are excluded from the list since they do not need to be isolated and fragmented anymore.

A third task-specific stream relates to determining the presence of a marker ion in fragment mass spectra.

The preferred mass spectrometric system comprises an IMS separator, a mass filter, a fragmentation cell and a time-of-flight mass analyzer (TOF) with orthogonal ion injection and can be operated in mode where the mass filter is switched off or is adjusted to a wide mass window for transmitting multiple precursor ion species to the fragmentation cell. The acquired fragment mass spectra are mixed fragment mass spectra, i.e., that fragment mass signals from different precursor ion species are present in a single fragment mass spectrum.

The peak data of the mixed fragment mass spectra acquired during a MS2 cycle span a mass-mobility map for which one axis indicates a mobility related value and a perpendicular axis indicates the mass related value. A strip of the mass-mobility map, which is centered at a characteristic mass and extends along the mobility axis, is divided into regions. The regions covering the strip may or may not overlap. Each data packet comprises a subset of the peak data wherein each subset comprises those ordered triples of the peak data whose mobility related values and mass related values fall in one of the regions covering the strip of the mass-mobility map. The characteristic mass can for example be that of the immonium ion at m/z 216. This fragment ion is commonly used as a "reporter ion" or "trigger fragment" for the identification of tyrosine phosphorylated peptides. Therefore, the stream-specific task can be used to determine whether a tyrosine phosphorylated peptide is present during a MS2 cycle and where it is located in the mass-mobility map along the mobility axis. The result data resulting from the task-specific stream can be combined with peak data of a previously acquired MS1 cycle to generate a combined stream for identifying the corresponding precursor ion species in the peak data of the MS1 cycle or to control the mass window of the mass filter in one or more subsequent IMS separation for limiting the number of possible candidates for the corresponding precursor ion species.

A fourth task-specific stream relates to identification of an ion species using the mass signals of fragment mass spectra acquired during MS2 cycle. In contrast to the second task-specific stream, the fragment mass spectra are mixed fragment mass spectra and the analysis is so called data-independent analysis (DIA). The mass filter is not adjusted to transmit single precursor ion species but to transmit multiple precursor ion species. The mass window has typically a width between 10 and 50 Da. The position of the mass window of the mass filter is changed step-wisely during an IMS separation.

A data packet comprises the peak data of the mixed fragment mass spectra which are acquired during a single step of the mass filter. The identification is performed by an analyzing device and can comprise a comparison of the measured fragment mass signals (represented by the triples of the data packet) with reference fragment mass spectra or in-silico generated fragment spectra of known substances. The reference fragment mass spectra and in-silico generated fragment spectra are additional data needed for the identification and can be stored locally in the analyzing devices or requested from external sources via the network. The third and fourth task-specific stream can be generated and analyzed in parallel.

In a specific DIA of the mass spectrometric system, mass-mobility maps are acquired in multiple M2 cycles wherein the position of the mass window of the mass filter is varied during each MS2 cycle and also shifted between subsequent MS2 cycles. Preferably, the position of the mass window is continuously varied during a single MS2 cycle. The peak data of the mixed fragment mass spectra acquired during a single MS2 cycle span a mass-mobility map. A fifth task specific stream relates to determining the presence and/or intensity of a specific fragment ion species in the multiple mass-mobility maps which gives a pattern that can be used to assign the fragment ion to a precursor ion species. The data packets of the fifth task-specific stream are generated from peak data of the multiple mass-mobility maps. For this task-specific stream, the peak data is a series of ordered quadruples (4-tuples). Each ordered quadruple represents a single mass signal of an acquired mass spectrum and comprises the number of the MS2 cycle, one mobility related value, one mass related value (e.g. time-of-flight or calibrated mass) and one intensity related value. Each one of the mass-mobility maps is divided into regions wherein the size and position of the regions are the same for all mass-mobility maps. Each region covers a limited mobility and mass range of the mass-mobility map. Different regions may or may not overlap. Each data packet comprises all peak data from the multiple mass-mobility maps whose mobility related values and mass related values are in one of the regions.

As described in the embodiments above, the data packets of a task-specific stream can include all peak data whose mobility related values and mass related values are in a limited region of a single mass-mobility map or multiple consecutive mass-mobility maps. The mass mobility-map(s) can be the acquired in MS1 or MS2 cycle(s). However, it is also possible that the data packets of a stream include all peak data whose mobility related values and mass related values are in one of the two or more non-contiguous regions of a single mass-mobility map or multiple consecutive mass-mobility maps.

A first advantage of the present invention is that the acquisition unit (being part of the apparatus or mass spectrometric system) is decoupled from devices for analyzing peak data generated from acquired mass signals. Therefore, the process of generating the peak data from the mass signals is not limited by computational resources needed for analyzing the peak data, in particular not by the access to shared memory via a mutually used local computer bus.

A second advantage of the present invention is that the processing and analyzing of the peak data is not based on a file-based representation of the peak data, i.e. that peak data are not stored in a structure determined by temporal sequence of their acquisition, but by an task-based representation of the peak data. The streaming device generates task-specific streams of data packets, each representing a reduced subset of the peak data to which a particular analysis can be applied without additional peak data. The analyzing devices do not need to extract peak data from the file-based representation but are provided with meaningful digital data packets.

A third advantage of the present invention is that the apparatus is horizontally scalable by adding more analyzing devices and that it can be further adapted to integrate other resources via the network, e.g. cloud services or internet services.

DETAILED DESCRIPTION

Figure 1:
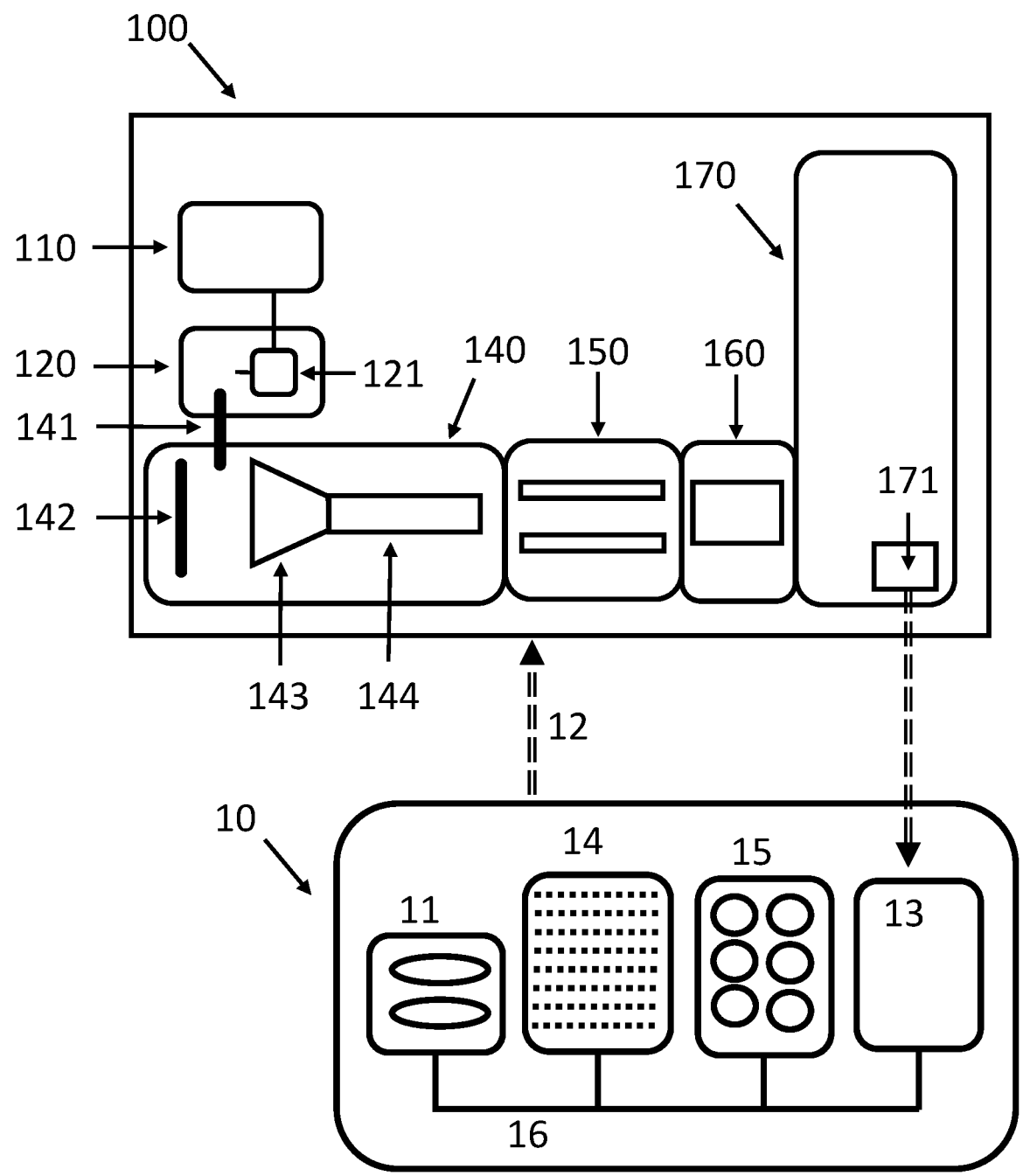
FIG. 1 shows a mass spectrometric system 100 and an apparatus 10 for analyzing mass spectral data according to the prior art.
Figure 2:
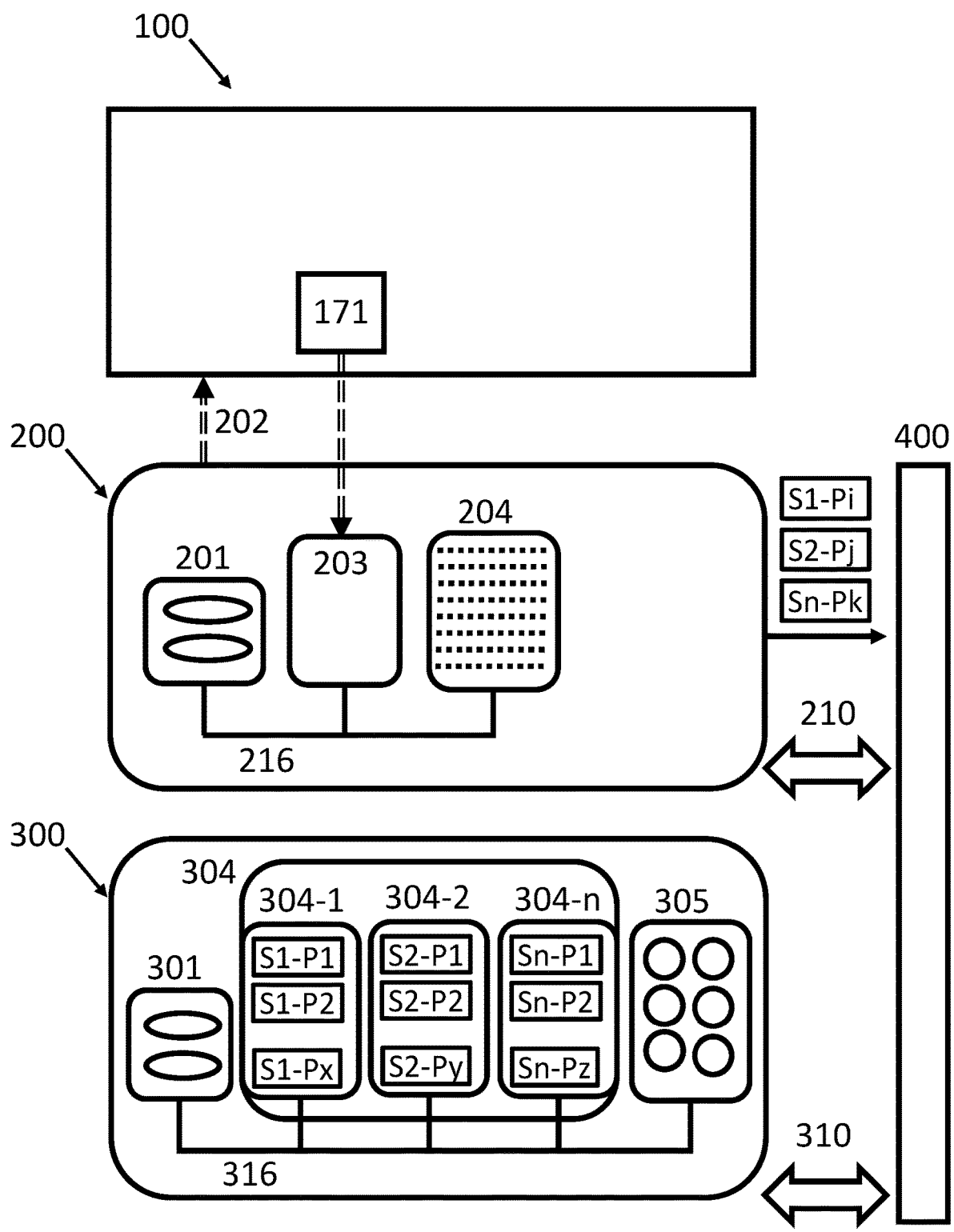
FIG. 2 shows a first embodiment of an apparatus for analyzing peak data according to the invention which is coupled to a mass spectrometric system 100 and comprises a streaming device 200, an analyzing device 300 and a network 400 wherein the analyzing device 300 comprises a memory 304 for storing data packets generated by and received from the streaming device 200 via the network 400.

FIG. 2 shows a first embodiment of an apparatus for analyzing peak data according to the invention, which is coupled to a mass spectrometric system 100 and comprises a streaming device 200, an analyzing device 300 and a network 400. The mass spectrometric system 100 can for example be the IMS-q-OTOF systems shown in FIG. 1.

The streaming device comprises a CPU 201, an acquisition unit 203 and a memory 204 which are all connected via a local PCI express bus 216. The streaming device 200 controls the mass spectrometric system 100 via control line 202. The acquisition unit 203 is connected to an ion detector 171 which delivers a pulsed analog current for ions reaching the ion detector 171. The acquisition unit 203 comprises an analog-to-digital converter for digitizing the pulsed electron current and a processing unit to generate peak data from the digitized current. The peak data is a list of ordered triples wherein each ordered triple represents a single mass signal of a acquired mass spectrum and comprises one mobility related value (e.g. IMS scan time or number of spectrum in the IMS scan or calibrated mobility), one mass related value (e.g. time-of-flight or calibrated mass) and one intensity related value. The peak data for all (fragment) mass spectra acquired during a single mobility separation are stored in a file-based representation in the memory 204. The streaming device processes the peak data and generates multiple data streams (S1, S2, . . . Sn) wherein each one of the data streams comprises multiple data packets (S1–Pi; S2–Pj; . . . Sn–Pk with i, j, k=1 . . . . N). The data packets (S1–Pi; S2–Pj; . . . Sn–Pk) are sent to the network 400 via a network interface 210.

The analyzing device 300 is a separated device and not connected to the local PCI express bus 216 of the streaming device 200. It comprises a CPU 301, a memory 304, a GPU 305 and a local PCI express bus 316 and is configured to receive the data packets (S1-Pi; S2-Pj; . . . Sn-Pk) of the multiple streams (S1, S2, . . . Sn) from the network 400 via a network interface 310. The received data packets are stored in different stream specific partitions (304-1, 304-2, . . . 304-n) of the memory 304. The CPU 301 transforms the data packets such that they can be allocated to and processed in the different cores of the GPU 305. The cores of the GPU 305 access the transformed stream-specific data packets (S1-Pi; S2-Pj; . . . Sn-Pk) stored in the partitions (304-1, 304-2, . . . 304-n) of the memory 304 via the local PCI bus 316. The data packets are processed or analyzed by the cores of the GPU 305 in parallel.

The analyzing device 300 can communicate with further sources (e.g. databases or cloud services, not shown) via the network 400 for requesting additional data or services (e.g. predicting collision cross sections which relate to ion mobility via the Mason-Schamp equation) which are not peak data stored in the memory of the streaming device 200. The same data packet can for example be allocated to different cores of the GPU 305 while these cores are provided with different additional data from the sources for analyzing the data packet in parallel depending on the different additional data. The results of the analysis of the processing units of the analyzing device 300 can be sent via the network to one or multiple additional devices (not shown) used to organize the results for a user.

Figure 3:
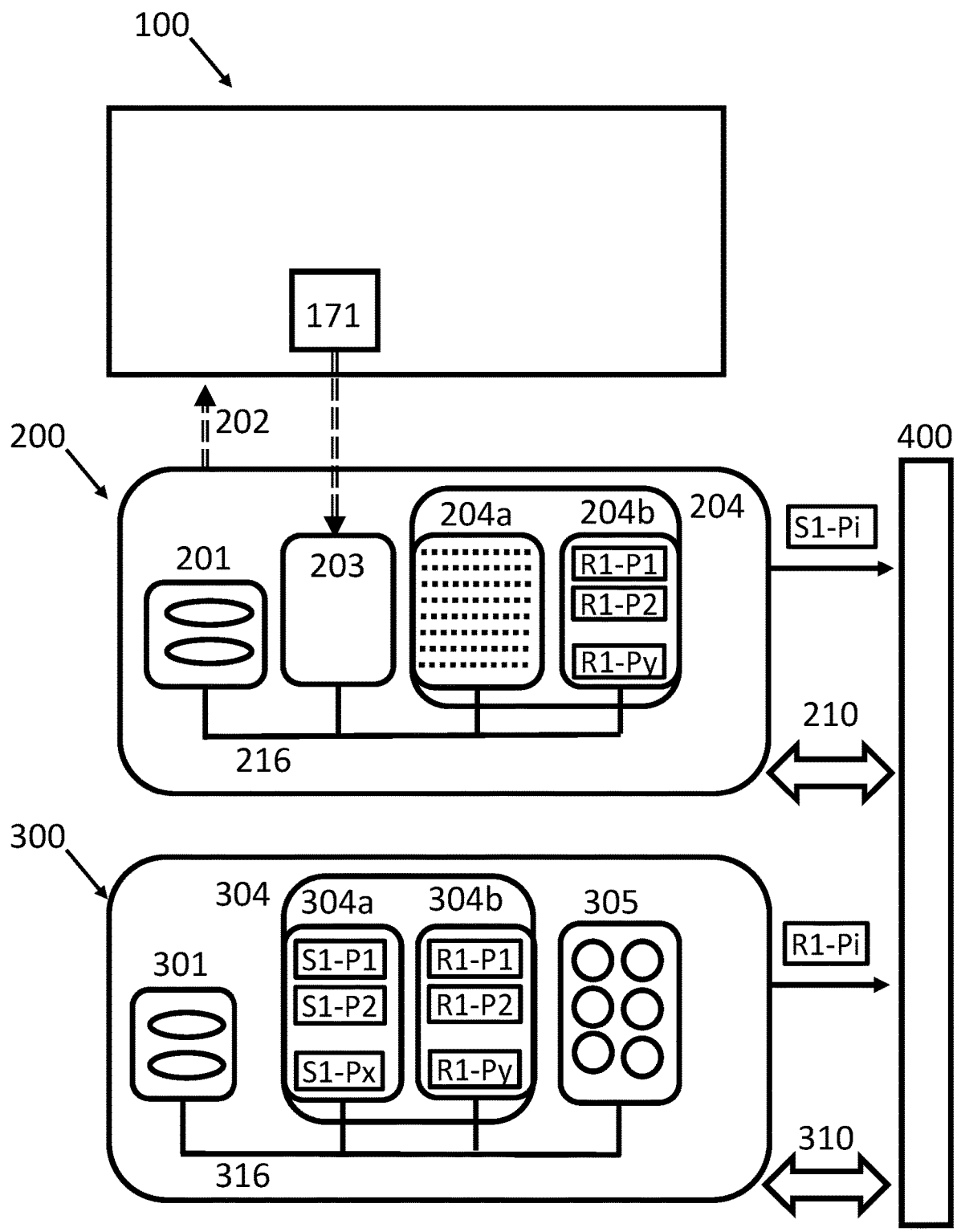
FIG. 3 shows a second embodiment of an apparatus for analyzing peak data according to the invention, which is coupled to a mass spectrometric system 100 and comprises a streaming device 200, an analyzing device 300 and a network 400 wherein the analyzing device 300 comprises a GPU 305 with multiple cores and local memories for storing data packets generated by and received from the streaming device 200 via the network 400.

FIG. 3 shows a second embodiment of an apparatus for analyzing peak data according to the invention, which is coupled to a mass spectrometric system 100 and comprises a streaming device 200, an analyzing device 300 and a network 400.

Like in the first embodiment, the mass spectrometric system 100 can for example be the IMS-q-OTOF system shown in FIG. 1. The streaming device 200 and the analyzing device 300 have the same components as in the first embodiment. The acquisition unit 203 provides peak data which are stored in the memory 204 in a file-based representation in partition 204a. The streaming device 200 processes the peak data and generates a data stream S1 comprising data packets S1-Pi. The data packets (S1-Pi) are sent to the network 400 via a network interface 210.

The analyzing device 300 is a separated device and not connected to the local PCI express bus 216 of the streaming device 200. It comprises a CPU 301, a memory 304, a GPU 305 and a local PCI express bus 316 and is configured to receive the data packets S1-Pi from the network 400 via a network interface 310. Like in the first embodiment, the received data packets S1-Pi are stored in a stream specific partition of the memory 304a, transformed and then allocated to local memories of cores of the GPU 305. The data packets S1-Pi are processed or analyzed by the cores of the GPU 305 in parallel.

The data packets R1-Pi result from analyzing the corresponding data packets S1-Pi. They are stored in the memory 304 and sent as a result stream R1 to the network 400 via the network interface 310. The data packets R1-Pi of the result stream R1 are received by the streaming device 200 and can be stored in a stream-specific partition 204b of the memory 204. The streaming device can for example use the received result stream R1 to generate new data streams by combining the result stream R1 with peak data in partition 204b or to control the mass spectrometric system via the control line 12, e.g. for scheduling precursor ion species for a data-dependent MS2 analysis or for adjusting instrumental parameters like the fragmentation voltage of a CID cell. The received result data can be directly consumed from the network 400 to control the mass spectrometric system.

Figure 4:
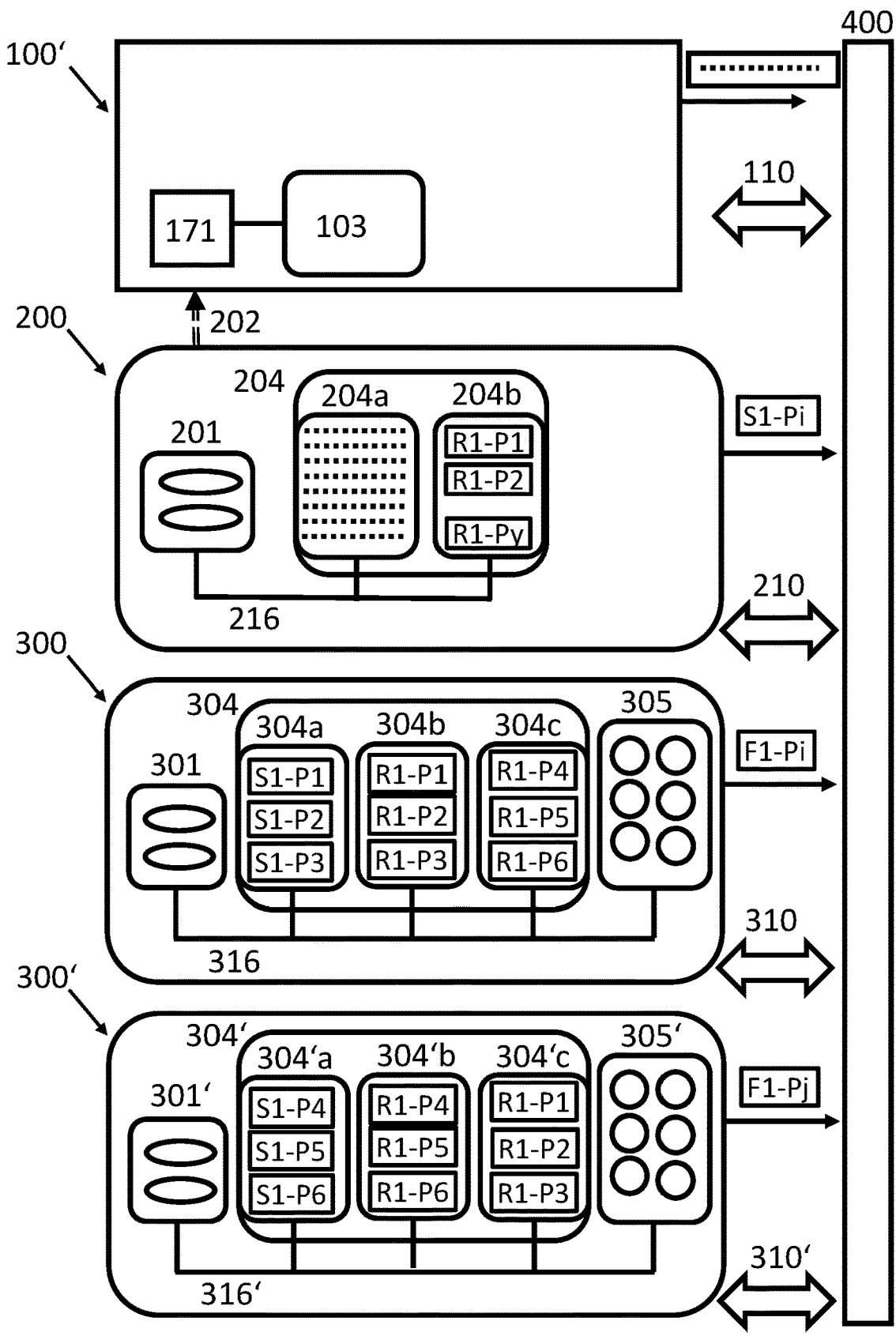
FIG. 4 shows a third embodiment of an apparatus for analyzing peak data according to the invention, which is coupled to a mass spectrometric system 100' and comprises a streaming device 200, two analyzing devices (300, 300') and a network 400. The acquisition unit 103 is integrated in the mass spectrometric system 100' and coupled to the streaming device 200 via a network 400.

FIG. 4 shows a third embodiment of an apparatus for analyzing peak data according to the invention, which is coupled to a mass spectrometric system 100' and comprises a streaming device 200, two analyzing devices (300, 300') and a network 400.

Like in the first embodiment, the mass spectrometric system 100' can for example be the IMS-q-OTOF systems shown in FIG. 1. In contrast to the embodiments above, the acquisition unit 103 is not a component of the streaming device 200, but it is integrated in the mass spectrometric system 100'. The acquisition unit 103 is connected to an ion detector 171 which delivers a pulsed analog current for ions reaching the ion detector 171. The acquisition unit 103 comprises an analog-to-digital converter for digitizing the pulsed electron current and a processing unit to generate peak data from the digitized current. The peak data is a list of ordered triples wherein each ordered triple represents a single mass signal of a acquired mass spectrum and comprises one mobility related value (e.g. IMS scan time or number of spectrum in the IMS scan), one mass related value (e.g. time-of-flight or frequency) and one intensity related value. The mass spectrometric system 100' sends the peak data as an instrument stream to the network 400 via a network interface 110. The streaming device 200 retrieves the data packets of the instrument stream and stores them in memory 204. The peak data is transmitted as packets wherein a packet can for example comprise a single triple, all triples of a single acquired mass spectrum or all triples of a plurality of acquired mass spectra, e.g. of all mass spectra acquired during a IMS separation.

As in the embodiments above, the streaming device comprises a CPU 201 and a memory 204 and controls the mass spectrometric system via control line 202. The streaming device 200 receives the peak data from the network via the network interface 210 and stores them in partition 204a of the memory 204 in a file-based representation. The streaming device processes the peak data and generates a stream S1 comprising multiple data packets (S1-Pi). The data packets (S1-Pi) are sent to the network 400 via a network interface 210.

The analyzing devices 300 and 300' each comprise a CPU (301, 301'), a memory (304, 304') and a GPU (305, 305') and may receive data packets (S1-Pi) from the network 400 via the respective network interfaces (310, 310'). Like in the embodiments above, the received data packets S1-Pi are stored in stream specific partitions (304a, 304'a) of the memories (304, 304') transformed and then allocated to local memories of cores of the GPU (305, 305'). The data packets S1-Pi are processed or analyzed by the cores of the GPU (305, 305') in parallel.

If one of the analyzing devices (300, 300') retrieves a data packet and allocates it to a core of the GPU (305, 305'), a data packet of a feedback stream F1 is generated and distributed to the network 400. The analyzing devices (300, 300') as well as the streaming device 200 receive data packets of the feedback stream F1 from the network 400. The feedback stream F1 may help to organize the distribution of data packets from the streaming device to multiple analyzing devices. Beside the feedback stream, the analyzing devices (300, 300') can share results of their analysis by result streams (not shown) via the network 400. The streaming device 200 may also receive result streams from the analyzing devices (300, 300'). The received result streams can be used by the streaming device 200 to control the mass spectrometric system (e.g. to deselect all precursor peptide ion species from a selection list of a data-dependent analysis which relate to a protein identified by one of the analyzing devices) as well as to combine received data of the result streams with peak data to generate and send combined streams to be analyzed by the analyzing devices.

Although the invention has been explained in relation to its preferred embodiments, it is to be understood that many other possible modifications and variations can be made without departing from the spirit and scope of the disclosure.

The invention claimed is:

1. An apparatus for analyzing peak data generated from mass signals acquired by a mass spectrometric system, the apparatus comprising:
   a streaming device that comprises a first network interface and that is configured to (a) generate peak data from the acquired mass signals or to receive peak data generated externally from the acquired mass signals, (b) group the peak data into independently processable data packets which relate to a different mass spectrometry related processing tasks, and (c) distribute the data packets in a different task-specific streams via the first network interface onto a network; and
   at least one analyzing device that comprises a second network interface and that is configured to (a) retrieve the data packets of the different task-specific streams via the second network interface from the network, (b) perform the different mass spectrometry related processing tasks on the retrieved data packets of the respective different task-specific streams to produce result data, (c) package the result data in a result data packets, and (d) distribute the respective result data packets in the respective different task-specific streams via the second network interface onto the network.

2. The apparatus according to claim 1, wherein the peak data is a series of tuples, each tuple representing a single mass signal.

3. The apparatus according to claim 1, wherein the at least one analyzing device comprises multiple processing units each of which is configured to perform the processing task on different data packets simultaneously.

4. The apparatus according to claim 3, wherein the at least one analyzing device comprises a central processing unit (CPU), a global memory, and a graphics processing unit (GPU) and the CPU is configured to store retrieved data packets of the task-specific stream in the global memory, to transform the data packets into a GPU compatible format, and to transfer the transformed data packets to the GPU cores which perform the processing task on the transformed data packets simultaneously.

5. The apparatus according to claim 1, wherein the apparatus comprises a plurality of analyzing devices which are configured to perform the processing task on different data packets simultaneously.

6. The apparatus according to claim 5, wherein each data packet is distributed with a header that comprises an identification key and/or information regarding the analyzing device which is intended to retrieve and process the data packet.

7. The apparatus according to claim 5, wherein the analyzing devices are further configured to retrieve result data packets of the other analyzing devices and wherein the result data of an analyzing device comprises information that a specific data packet is processed by the analyzing device.

8. The apparatus according to claim 1, wherein each data packet is distributed with a header that comprises information regarding the processing task.

9. The apparatus according to claim 1, wherein the intersection set between a first data packet of a first task-specific stream and a second data packet of a different task-specific stream is not empty, i.e., that a single tuple of the peak data is present in different task-specific streams.

10. The apparatus according to claim 1, wherein the streaming device is configured to generate each data packet of a task-specific stream immediately after the peak data needed for the data packet is available such that the data packets of the task-specific stream are distributed in real-time onto the network.

11. The apparatus according to claim 1, wherein the streaming device comprises an acquisition unit which is connected to a local computer bus of the streaming device and to an ion detector of the mass spectrometric system and is configured to generate the peak data from mass signals detected by the ion detector.

12. The apparatus according to claim 11, wherein the ion detector generates an pulsed electron current, said ion detector preferably comprising a secondary electron multiplier, and the acquisition unit comprises an analog-to-digital converter for digitizing the pulsed electron current and a processing unit to generate the peak data from the digitized signal.

13. The apparatus according to claim 1, wherein the streaming device is connected to an acquisition unit of the mass spectrometric system via the network or an additional data link, said acquisition unit being connected to an ion detector of the mass spectrometric system and configured to (a) generate the peak data from mass signals detected by the ion detector and (b) transmit the peak data to the streaming device via the network interface or the additional data link, respectively.

14. The apparatus according to claim 1, wherein the streaming device is further configured to retrieve result data packets from the network and organize them according to a predetermined result data protocol.

15. The apparatus according to claim 14, wherein the streaming device is further configured to combine the peak data and the retrieved result data into independently processable data packets which relate to an additional processing task and to distribute the data packets in an additional task-specific stream via the first network interface onto a network.

16. The apparatus according to claim 14, wherein the streaming device is connected to the mass spectrometric system and configured to modify the operation of the mass spectrometric system depending on the result data of the retrieved result data packets.

17. The apparatus according to claim 1, further comprising an additional device that is configured to retrieve result data packets from the network and organize them according to a predetermined result data protocol.

18. The apparatus according to claim 17, wherein the additional device is connected to the mass spectrometric system and configured to modify the operation of the mass spectrometric system depending on the result data of the retrieved result data packets.

19. The apparatus according to claim 1, wherein the network uses an ethernet protocol.

20. The apparatus according to claim 1, further comprising a local area network.

21. The apparatus according to claim 1, wherein each data packet is distributed with a header that comprises operation parameters of the mass spectrometric system and/or acquisition times of the mass signals represented in the data packet which relate to retention times of corresponding analytes eluting from a separation device coupled to the mass spectrometric system.

22. The apparatus according to claim 1, wherein each tuple of the peak data is a triple that comprises a mobility related value, a mass related value and an intensity related value and that represents a single mass signal acquired by the mass spectrometric system comprising a mobility separator and a mass analyzer.

23. The apparatus according to claim 1, wherein each tuple of the peak data is a quadruple that comprises two coordinates of a position on a sample, a mass related value and an intensity related value and that represents a single mass signal acquired by the mass spectrometric system comprising an ion source configured to generate ions from different positions of the sample and a mass analyzer.

24. The apparatus according to claim 1, wherein each tuple of the peak data is a quintuple that comprises two coordinates of a position on a sample, a mobility related value, a mass related value and an intensity related value and that represents a single mass signal acquired by the mass spectrometric system comprising an ion source configured to generate ions from different positions of the sample an mobility separator and a mass analyzer.

25. The apparatus according to claim 1, wherein mass signals are acquired in a MS1 mode of the mass spectrometric system comprising a mobility separator and a mass analyzer and the processing task relates to identifying precursor ions in a mass-mobility map for which one axis indicates ion mobility and a perpendicular axis indicates mass-to-charge ratio.

26. The apparatus according to claim 1, wherein mass signals are acquired in a MS2 mode of the mass spectrometric system comprising a mobility separator, a fragmentation cell and a mass analyzer and the processing task relates to identifying an ion species using the mass signals of acquired MS2 mass spectrum.

27. The apparatus according to claim 1, wherein mass signals are acquired in a MS2 mode of the mass spectrometric system comprising a mobility separator, a fragmentation cell and a mass analyzer and the processing task relates to determining the presence of a marker ion or neutral loss in the acquired MS2 mass spectrum.

\* \* \* \* \*